(12) United States Patent  
Das Purkayastha

(10) Patent No.: US 11,550,724 B2
(45) Date of Patent: Jan. 10, 2023

(54) METHOD AND SYSTEM FOR LOGICAL TO PHYSICAL (L2P) MAPPING FOR DATA-STORAGE DEVICE COMPRISING NONVOLATILE MEMORY

(71) Applicant: SAMSUNG ELECTRONICS CO., LTD., Suwon-si (KR)

(72) Inventor: Saugata Das Purkayastha, Bangalore (IN)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 0 days.

(21) Appl. No.: 17/039,268

(22) Filed: Sep. 30, 2020

(65) Prior Publication Data

US 2022/0050784 A1    Feb. 17, 2022

(30) Foreign Application Priority Data

Aug. 14, 2020  (IN) .............................. 202041035141

(51) Int. Cl.
| | | |
|---|---|---|
| *G06F 12/08* | (2016.01) | |
| *G06F 12/0882* | (2016.01) | |
| *G06F 12/0868* | (2016.01) | |
| *G06F 13/16* | (2006.01) | |
| *G06F 12/02* | (2006.01) | |

(52) U.S. Cl.
CPC ...... *G06F 12/0882* (2013.01); *G06F 12/0238* (2013.01); *G06F 12/0868* (2013.01); *G06F 13/1673* (2013.01); *G06F 2212/7201* (2013.01)

(58) Field of Classification Search
CPC ............. G06F 12/0238; G06F 12/0868; G06F 2212/7201; G06F 12/0882; G06F 13/1673
USPC .......................................................... 711/154
See application file for complete search history.

(56) References Cited

U.S. PATENT DOCUMENTS

| | | | |
|---|---|---|---|
| 9,268,682 B2 | 2/2016 | Tomlin et al. | |
| 2019/0220396 A1* | 7/2019 | Lin ..................... | G06F 12/1009 |
| 2020/0264984 A1* | 8/2020 | Adams ................ | G06F 12/0292 |
| 2020/0409805 A1* | 12/2020 | Kim .................... | G06F 12/0811 |

* cited by examiner

*Primary Examiner* — Hua J Song
(74) *Attorney, Agent, or Firm* — F. Chau & Associates, LLC

(57) ABSTRACT

The present disclosure provides a method of logical to physical mapping for a data-storage device comprising a non-volatile memory device. The method comprises maintaining a first type of information representing at least a part of a logical-to-physical address translation map. Further, the method comprises maintaining a second type of information pertaining to the logical-to-physical translation map as a part of a physical page. Further, the method comprises completing a logical-to-physical mapping based on the first and second type of information to thereby determine a physical location, within one or more of the physical pages, of the data stored in each logical page.

20 Claims, 8 Drawing Sheets

METHOD AND SYSTEM FOR LOGICAL TO PHYSICAL (L2P) MAPPING FOR DATA-STORAGE DEVICE COMPRISING NONVOLATILE MEMORY

CROSS-REFERENCE TO RELATED APPLICATION

This application claims priority to, and the benefit of, Indian Application Ser. No. 202041035141 filed on Aug. 14, 2020. The entire contents of the foregoing application are hereby incorporated by reference for all purposes.

FIELD OF THE INVENTION

The present invention relates to a memory device and in-particular to a solid-state storage device (SSD).

BACKGROUND OF THE INVENTION

Computer memory refers to a data storage device used to store information for use in a computer system or computer hardware. Solid-state drives (SSD) and hard disk drives (HDD) are examples of storage devices where information may be written to and read from the storage device.

SSDs may use general storage algorithms to determine optimized write and read sequences to be used on a host computing system. When the host behavior matches predetermined patterns, a high level of performance, endurance, and power consumption may be achieved by the SSD. However, if the host patterns deviate from the expectations inherent in the programming of the memory device, performance may be compromised. Accordingly, there is a need in the art for a method of programming storage device to adapt their storage algorithms based on the host computing system.

SUMMARY

This summary is provided to introduce a selection of concepts in a simplified format that are further described in the detailed description of the present disclosure. This summary is not intended to identify key or essential inventive concepts of the claimed subject matter, nor is the summary intended for determining the scope of the claimed subject matter.

The present disclosure describes a method of logical-to-physical (L2P) mapping for a data-storage device comprising a non-volatile memory device. The method comprises maintaining a first-type of information representing at-least partly a logical-to-physical (L2P) address translation map. Further, the method comprises maintaining a second type of information pertaining to said L2P translation-map as a part of a physical page. Further, the method comprises completing a logical-to-physical mapping based on the first and second type of information to thereby determine a physical-location, within one or more of the physical pages, of the data stored in each logical page (L-Page).

The present disclosure also describes method of storing data in a memory device including storing data corresponding to a plurality of logical pages in a physical page of the memory device; storing first address information in a logical-to-physical (L2P) table, wherein the first address information indicates the physical page where the logical pages are stored; storing second address information in a spare area of the physical page, wherein the second address information indicates a location of each of the logical pages within the physical page; and reading at least a portion of the data from the memory device based at least in part on the first address information and the second address information.

The present disclosure supports a large-capacity SSD (32 TB) without increasing logical page size and incurring read modify write overhead, and associated endurance-impact. The present disclosure is scalable to be adopted for smaller capacity-drives for lower-granularity logical page size, e.g. 512 B size logical page but 4 KB granularity at physical level, and an SSD-capacity of 2 TB.

To further clarify the details of the present invention, a more particular description of the present disclosure will be rendered by reference to specific embodiments thereof, which is illustrated in the appended drawings. It is appreciated that these drawings depict typical embodiments of the present disclosure and are therefore not to be considered limiting of the scope. The present disclosure will be described and explained with additional specificity and detail with the accompanying drawings.

BRIEF DESCRIPTION OF FIGURES

The present invention will become better understood when the following detailed description is read with reference to the accompanying drawings in which like characters represent like parts throughout the drawings, wherein.

Figure 1:
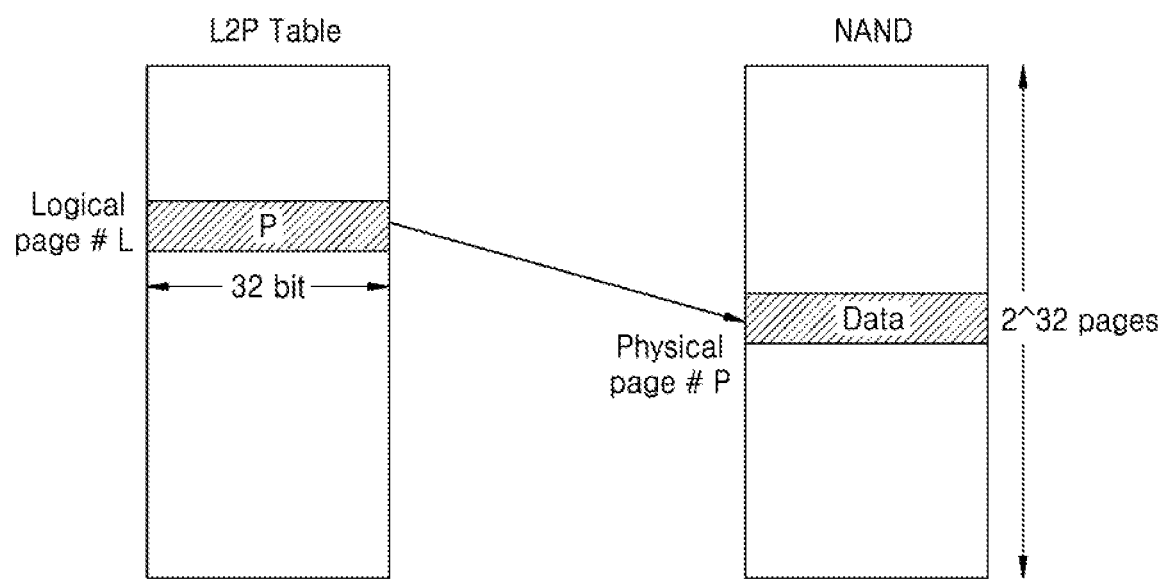
FIG. 1 illustrates a state of the art logical-to-physical (L2P) address mapping for SSD, in accordance with the embodiment of the present disclosure.

Further, skilled artisans will appreciate that elements in the drawings are illustrated for simplicity and may not have necessarily been drawn to scale. For example, the flow charts illustrate the method in terms of the most prominent steps involved to help understand aspects of the present invention. Furthermore, in terms of the construction of the device, one or more components of the device may have been represented in the drawings by conventional symbols, and the drawings may show specific details that are pertinent to understanding the embodiments of the present invention so as not to obscure the drawings with details that will be readily apparent to those of ordinary skill in the art with benefit of the description herein.

DETAILED DESCRIPTION

The present disclosure provides a method of L2P mapping for a data-storage device comprising a non-volatile memory device such as a solid-state-drive (SSD). SSDs may use storage algorithms to determine optimized write and read sequences to be used on a host computing system. However, if the host patterns deviate from the expectations inherent in the programming of the SSD, performance may be compromised. Thus, SSDs that have the ability to adapt storage algorithms with actual host-behavior rather than expected host-behavior may achieve improved synergy with the host, resulting in increased performance, endurance, and/or power consumption.

Systems and methods described in the present disclosure include maintaining information representing at least a part of a logical-to-physical address translation map. Additional information pertaining to the logical-to-physical translation map as a part of a physical page may also be maintained. A logical-to-physical mapping may be performed based on the information to determine a physical location, within one or more of the physical pages, of the data stored in each logical page.

Reference will now be made to the embodiment illustrated in the drawings and specific language will be used to describe the same to promote an understanding of the principles of the present disclosure. It will nevertheless be understood that no limitation of the scope of the present disclosure is thereby intended, such alterations and further modifications in the illustrated system, and such further applications of the principles of the present disclosure as illustrated therein being contemplated as would normally occur to one skilled in the art to which the present disclosure relates.

It will be understood by those skilled in the art that the foregoing general description and the following detailed description are explanatory of the present disclosure and are not intended to be restrictive thereof.

Reference throughout this specification to "an aspect", "another aspect" or similar language means that a particular feature, structure, or characteristic described in connection with the embodiment is included in at least one embodiment of the present invention. Therefore, appearances of the phrase "in an embodiment", "in another embodiment" and similar language throughout this specification may, but do not necessarily, all refer to the same embodiment.

The terms "comprises", "comprising", or any other variations thereof, are intended to cover a non-exclusive inclusion, such that a process or method that comprises a list of steps does not include only those steps but may include other steps not expressly listed or inherent to such process or method. Similarly, one or more devices or sub-systems or elements or structures or components proceeded by "comprises . . . a" does not, without more constraints, preclude the existence of other devices or other sub-systems or other elements or other structures or other components or additional devices or additional sub-systems or additional elements or additional structures or additional components.

Unless otherwise defined, all technical and scientific terms used herein have the same meaning as commonly understood by one of ordinary skill in the art to which this invention belongs. The system, methods, and examples provided herein are illustrative only and not intended to be limiting.

Embodiments of the present invention will be described below in detail with reference to the accompanying drawings:

FIG. 1 illustrates a state of the art L2P address mapping for SSD, in accordance with the embodiment of the present disclosure. In SSD architecture, the SSD maintains a data structure such as an L2P table, within a memory buffer, to map a logical page address in logic block address (LBA) space with a physical page address in a NAND memory of the SSD. The L2P table may store the mapping of logical-to-physical pages. The length and width of the L2P table may determine a capacity of the SSD. For a given SSD, the length and width are limited by available dynamic random access memory (DRAM) size.

In an example, with a standard 32-bit DRAM and a 4 KB physical page size, one can achieve up to $2^{32} \times 4$ KB=16 TB capacity within the SSD. However, to achieve 32 TB or greater capacity, a higher logical page size may be used. However, for such higher logical page size, a write-operation of 4 KB incurs "read-modify-write" overhead, effecting endurance of the storage device.

While length of the L2P in DRAM can be managed by demand loading the L2P table entries, the width of the L2P entry may not be managed. Accordingly, in 32-bit DRAM and with 4 KB logical page size in the HMB, a maximum capacity of the SSD supported is $2^{32} \times 4$ KB=16 TB.

However, considering the example of a DRAM of 32 TB memory-size, an L2P table entry uses 33-bit, thereby exceeding the present 32-bit limit of DRAM. Accordingly, the conventional SSD executes the mapping with 8 KB page-size instead of 4 KB page-size, to fit the L2P table entry to 32-bit. With 8 KB mapping, any random-write of 4 KB uses read-modify-write overhead, which increases write amplification and impacts endurance. An option to address the present constraint is with multiple levels of L2P table. However, such a mechanism will use multiple NAND reads for look-up, thereby rendering an additional latency.

Figure 2:
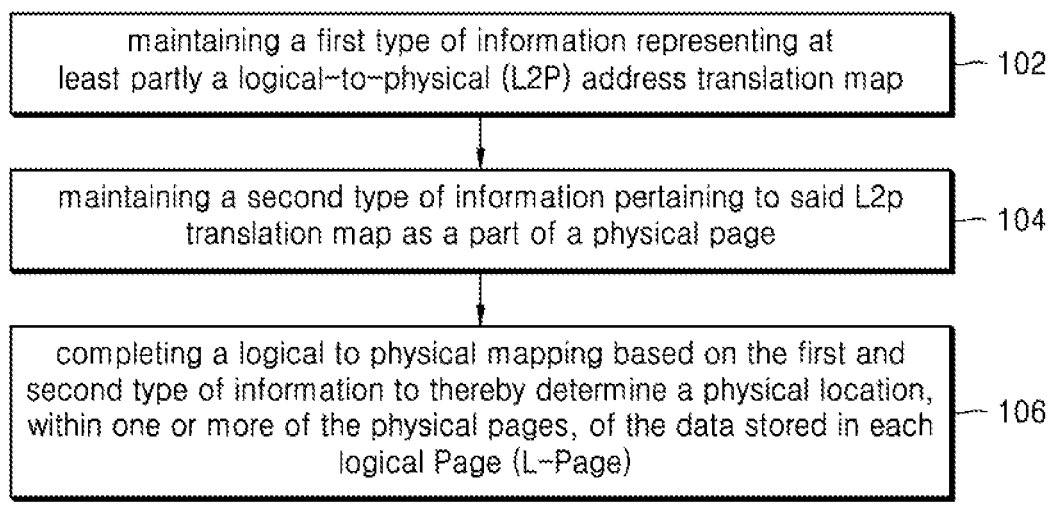
FIG. 2 illustrates a method of operation, in accordance with the embodiment of the present disclosure.

FIG. 2 illustrates a method of operation in accordance with the present disclosure. A method of L2P mapping for a data-storage device comprising a non-volatile memory device is disclosed. The method comprises maintaining a first-type of information representing at least partly a logical-to-physical (L2P) address translation map (step 102). Further, the method comprises maintaining a second-type of information pertaining to said L2P translation map as a part of a physical page (step 104). A second type of information is stored within a spare area of the non-volatile memory to enable the L2P table and the spare area to render the completed logical to a physical map. An order of the logical pages within the physical page corresponds to a sequence of logical page numbers (LPNs) in the spare of the physical page. Within such spare area of the physical page, a plurality of logical page (L-Page) numbers (LPNs) of the plurality of logical pages are stored.

The method further comprises completing a L2P mapping based on the first and second type of information to thereby determine a physical-location, within one or more of the physical pages, of the data stored in each logical page (step 106).

The method comprises writing data in a plurality of logical pages (L-Pages) corresponding to a single physical page of the non-volatile memory, wherein each of the plurality of L-Pages are associated with an L-Page number configured to enable a controller to logically reference data in a corresponding physical page. The writing operation comprises updating a spare area of the physical page (currently under consideration) of the non-volatile memory to indicate a logical page number. The L2P translation map is updated to point to the physical page defining the location of the storage of the logical page. The written-data is transferred to the physical-location of the non-volatile memory in accordance with the updated translation map.

During a read operation, the method further comprises fetching the physical page holding the plurality of logical page based on the first type of information. The contents of the physical page are accessed to determine an offset at the location of the logical page corresponding to the first type of information. The offset corresponding to the logical page referred by the first type of information is transferred to enable data-transfer to a volatile-memory to enable the read operation. The read-operation is defined by an operation of a data extractor as transferring of the logical page corresponding to the first type of information from the physical page to a volatile memory to enable the read-operation.

Figure 3:
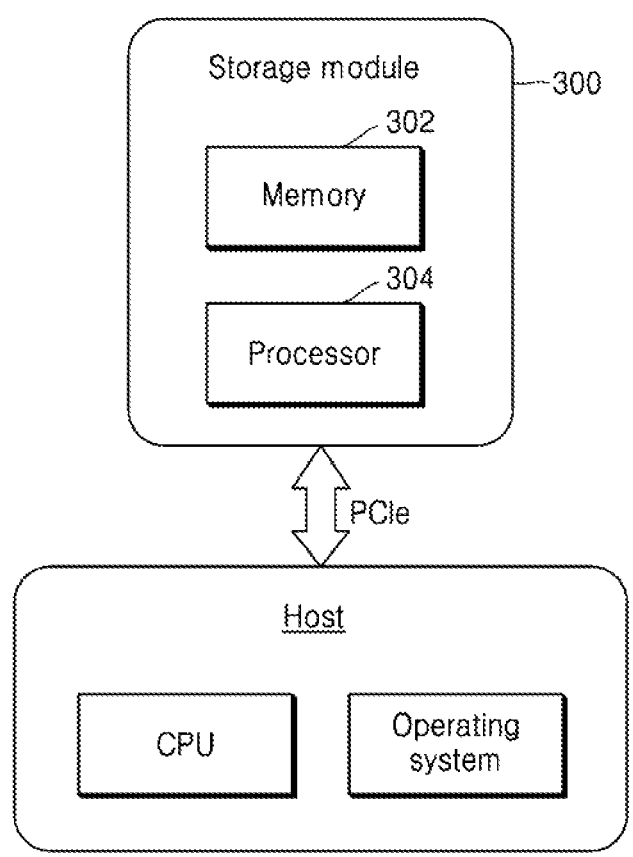
FIG. 3 illustrates a system, in accordance with the embodiment of the present disclosure.

FIG. 3 illustrates a detailed internal construction of a system or SSD storage module 300 in accordance with the embodiment of the present invention. The SSD storage module 300 includes a memory 302 and a processing device 304 to execute the method steps 102 to 106 of FIG. 2. Likewise, there may be a peripheral card interface such as PCIe, Serial-ATA (SATA), or any other interface that facilitates operational-interconnection between the storage module 300 and a host computing system. While the storage module 300 is removably-connected to the host through PCIe, the storage module 300 may also be integrated with a chipset of the host-computing system.

The storage module 300 comprises at least one of a storage buffer and a memory 302 (e.g., a non-volatile memory) configured to maintain a first type of information representing at least some of a logical-to-physical (L2P) address translation map and maintaining a second type of information associated with the L2P translation map as a part of a physical page. The memory 302 stores the second type of information in a spare-area and the L2P table within the buffer to enable the rendering of a complete logical to the physical map.

The physical page of the volatile memory comprises an order of the logical pages that corresponds to a sequence of logical page numbers in the spare of the physical page. The spare area of the physical page comprises a plurality of logical page numbers of the plurality of logical pages are stored. In one example, the buffer corresponds to a 96 KB buffer of a Double data rate random access memory (RAM) comprising at least one of 24 logical pages of 4 KB or 12 pages of 8 KB.

Further, the processing device 304 is configured to complete a L2P mapping, based on the first and second type of information to determine a physical location, with respect to the data stored in each logical page, within one or more of the physical pages of the non-volatile memory.

Figure 4:
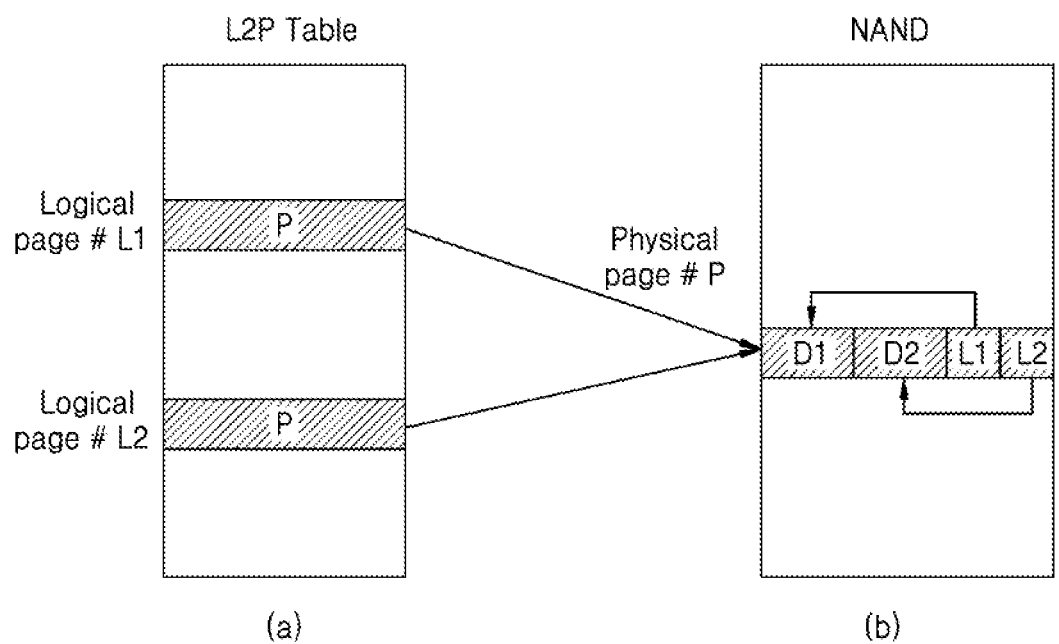
FIG. 4 illustrates an example layout of the L2P mapping table in accordance with an embodiment of the present disclosure.

FIG. 4 illustrates an example implementation depicting an operation in accordance with the present disclosure. More specifically, FIG. 4 illustrates an example layout of the L2P mapping table in accordance with the present disclosure.

In accordance with an implementation of the present disclosure, the L2P mapping provides a 4 KB granularity at a logical level but 8 KB granularity at physical level. Additionally or alternatively, while the physical page size in the NAND is 8 KB, the physical page of 8 KB is logically divided into two logical pages of 4 KB size each such that each 8 KB page holds two logical pages of 4 KB size. However, the present implementation shall not be construed as limiting and may be extended to cover lower-granularity logical page mapping, e.g. 512 B size logical page but 4 KB granularity at the physical level.

In an example, the first information as discussed in FIG. 1 corresponds to the logical page L1 that leads to a physical address of physical page P as a part of L2P address-mapping. However, unlike a conventional mechanism where L1 is solely used as the first information to read the data D1 from the physical page, the present disclosure uses the second information logical page number corresponding to the logical page L1 which is actually stored within the physical page P. Therefore, an offset is computed based on second information or the logical page number to return data D1. The details regarding the logical page number and the offset computation have been further referred to in the description of FIG. 6 to FIG. 8.

In other scenario, wherein L2 is the first information to locate physical page P, corresponding logical page number is found as the second information from physical page P to compute an offset and thereby return data D2 from the physical page P.

Figure 5:
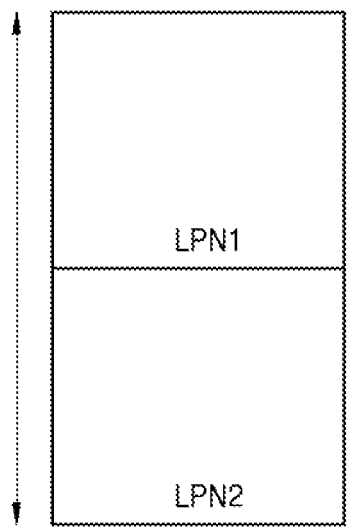
FIG. 5 illustrates a layout of spares in the physical page in accordance with the embodiment of the present disclosure.

FIG. 5 illustrates an example implementation depicting operation in accordance with the present disclosure. More specifically, FIG. 5 illustrates a layout of spares in the physical page in accordance with the present disclosure.

While each entry of L2P table is for a 4 KB logical page, the L2P table points to 8 KB physical page in NAND. In FIG. 5, within a spare area of the 8 KB physical page, the logical page numbers (LPN) of the two pages as LPN1/LPN2 are stored separately within the respective spare-area (e.g., a NAND spare area layout in Eagle FTL) of the two logical pages LPN1, LPN2. In another approach, the spares of 4 KB logical pages are combined per 8 KB indicating the LPNs stored. However, the order or sequence of the logical pages corresponding to the LPN1/LPN2 within the 8 KB page follows the same order as the logical page numbers LPN1/LPN2 in the spare area.

The L2P table merely stores a part of the logical-to-physical mapping and remaining mapping is done from the spare area. In some cases, there is no additional read-penalty for the look-up, since the mapping is part of spare of the same physical page.

Figure 6:
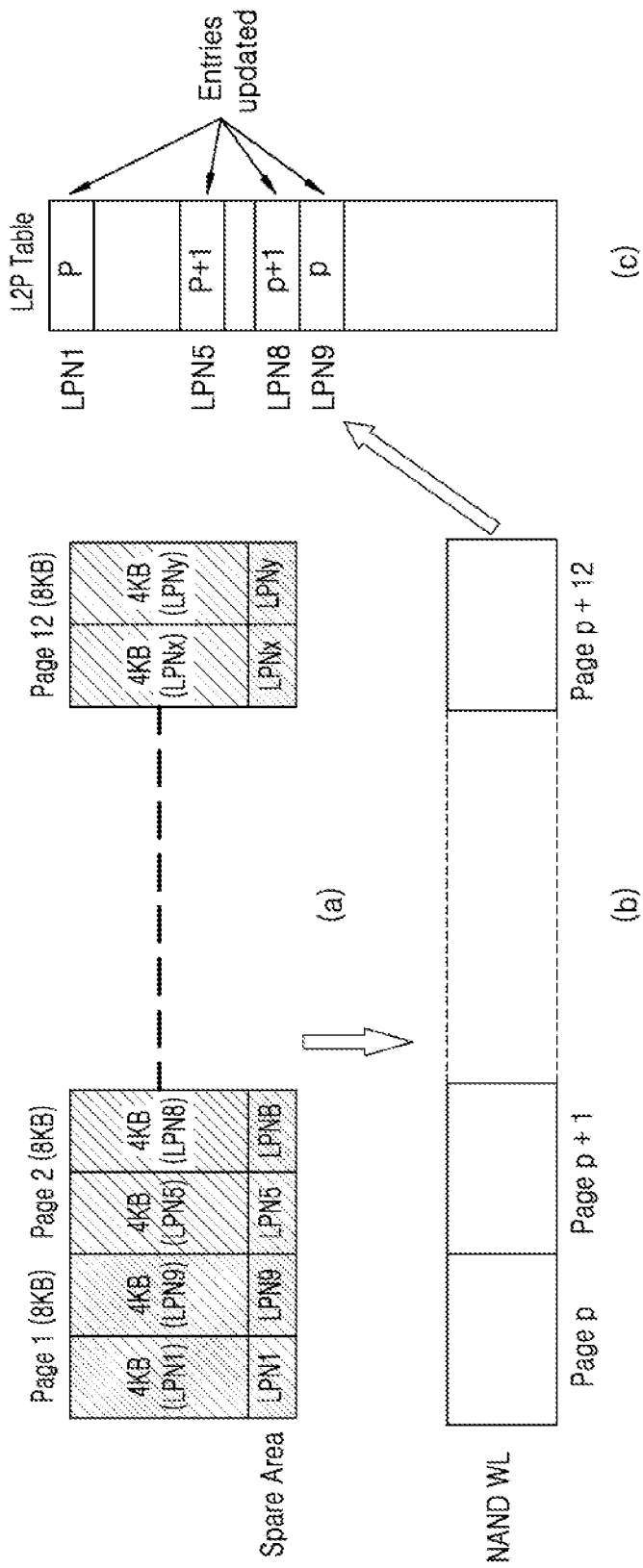
FIG. 6 illustrates a "Write" operation and Garbage clearance (GC) in accordance with the embodiment of the present disclosure.

FIG. 6 illustrates an example implementation depicting operation in accordance with the present disclosure. More specifically, FIG. 6 illustrates a "Write" operation and Garbage clearance (GC) in accordance with the present disclosure.

In FIG. 6a, the "writes" implemented by the host (i.e., the operating system of the computing system) are accumulated in a host memory buffer, e.g., a 96-KB buffer (24 logical pages of 4 KB or 12 pages of 8 KB) for a full write operation. The spares in the buffer are updated to the memory to indicate the logical page number.

In FIG. 6b, once the 96 KB buffer (i.e., the host memory buffer) is occupied and replete with data, programming to NAND is done, and accordingly, data is transferred from the DRAM to the NAND. Therefore, in FIG. 6c, the L2P is updated to point to the physical page where logical page is stored in view of the complete writing operation The processing device 304 of the storage module is configured for facilitating a write operation through receiving data to be written in a plurality of logical pages corresponding to a single physical page of the non-volatile memory, each of the plurality of L-Pages being associated with an L-Page number configured to enable a controller to logically reference data in one corresponding physical page. Therefore, a spare area within the non-volatile memory is updated to indicate the logical page number. Further, the written data within the volatile memory is transferred to the physical location of the non-volatile memory. The L2P translation map is also updated to point to the physical page defining the location of storage of the logical page in accordance with the completed writing operation.

Figure 7:
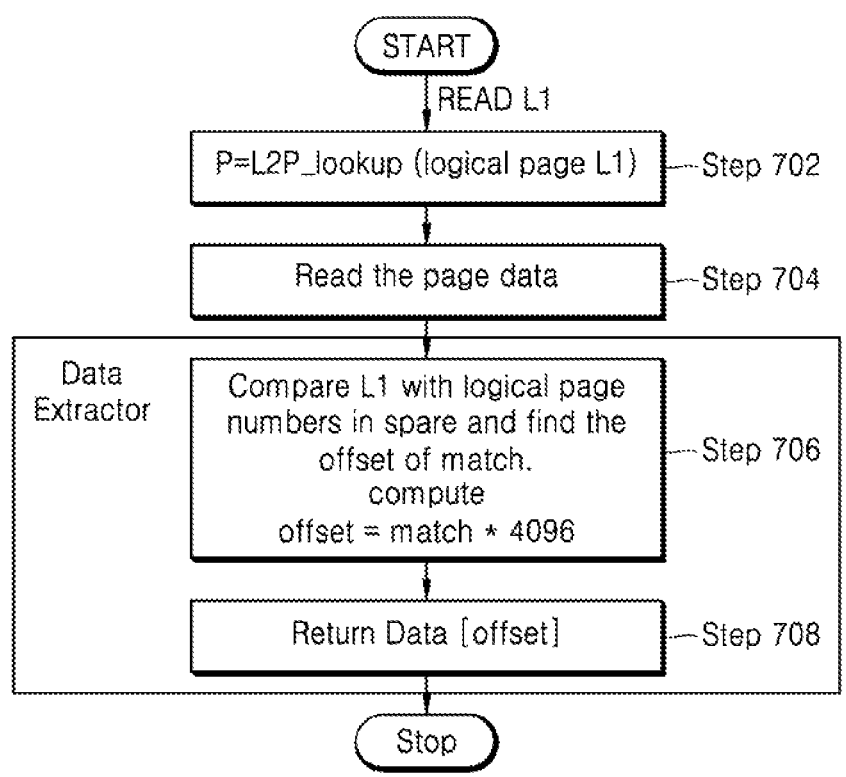
FIG. 7 illustrates a "Read" operation in accordance with the embodiment of the present disclosure.
Figure 8:
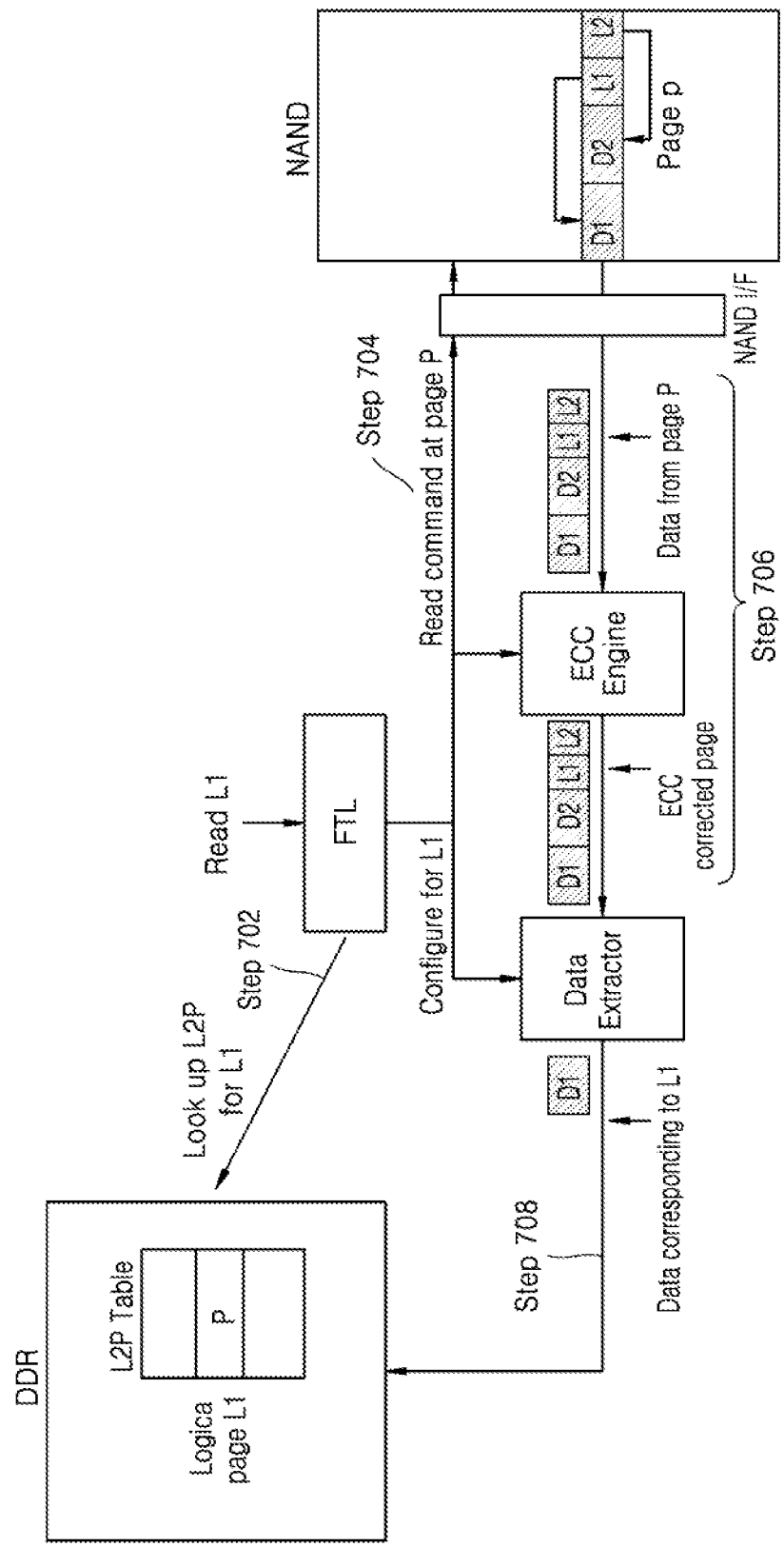
FIG. 8 illustrates a "Read" operation of FIG. 7 through an alternative representation, in accordance with the embodiment of the present disclosure.

FIGS. 7 and 8 illustrate an example implementation depicting operation in accordance with the present disclosure. More specifically, FIG. 7 and FIG. 8 illustrate "Read" operation in accordance with the present disclosure.

Step 702, as a part of the initiation of a read operation, a file transfer logic (FTL) fetches the 8 KB physical page P holding the logical page L1 based on a read-command directed to read the content of logical page L1. The Physical page 'P' is obtained based on mapping through the L2P mapper table.

Step 704, the data from physical page is read as D1 and D2. The fetched data is analysed for the internal data corruption and corrected by an error-correcting code memory (ECC) through a state of the art criteria.

Step 706 represents the processing of the data to extract the relevant data pertaining to the logical page L1. The processing may be performed either through a dedicated hardware engine or in software. Additionally or alternatively, the processing comprises analysis of the spare area of the physical page P and finding the offset where the logical page L is located.

In an example, the counterpart logical page L2 from the spare area, based on the spare area, is received. Based on a sequential combination of logical addresses L1 and L2, a match is obtained and multiplied with 4096 (due to 4 KB logical page size) and based on an offset value for the logic address L1 is obtained. Such offset value renders the physical address and/or location of the data D1 within the physical page P to fetch the data D1 that may correspond to the 4 KB logic page L1.

At Step 706, the fetched data D1 corresponding to the 4 KB logical page L1 out of the 8 KB physical page is sent to the RAM/DRAM as a part of the read operation.

The additional 4 KB transfer may be construed to be posing latency (e.g. of a plurality of microseconds) and the same is substantially offset due to an increase in terms of endurance in new NAND memory e.g. like QLC NAND. The endurance of the NAND memory is increased by avoiding read modify writes.

During a read operation, the processing device 304 is configured to fetch the physical page holding the plurality of logical page based on the first type of information, access contents of the physical page to determine an offset at the location of the logical page corresponding to the first type of information, and transfer the offset corresponding to the logical page referred by the first type of information to enable data transfer to a volatile memory to enable the read operation.

The processing device 404 comprises a data extraction module to enable a read-operation as transferring the logical page corresponding to the first type of information from the physical page to a volatile memory (i.e. DRAM).

The present disclosure renders support of a large capacity SSD (32 TB or more) without increasing the logical page size and incurring read-modify-write overhead, and associated endurance impact.

Thus, according to embodiments of the present disclosure, a method of storing data in a memory device may include storing data corresponding to a plurality of logical pages in a physical page of the memory device; storing first address information in a logical-to-physical (L2P) table, wherein the first address information indicates the physical page where the logical pages are stored; storing second address information in a spare area of the physical page, wherein the second address information indicates a location of each of the logical pages within the physical page; and reading at least a portion of the data from the memory device based at least in part on the first address information and the second address information.

In some cases, the method may further include receiving a write command from an external host device, wherein the write command includes an indication of the data the logical pages, and wherein the data is stored in response to the write command. In some cases, the method may include receiving a read command from an external host device, wherein the read command indicates one or more of the logical pages; identifying the physical page based on the read command and the first address information in the L2P table; and identifying one or more portions of the physical page where the one or more logical pages are stored based on the second address information stored in the spare area, wherein the at least a portion of the data is read in response to the read command.

In some cases, the method may include transferring the one or more logical pages from the physical page to a volatile memory, wherein the at least a portion of the data is read from the volatile memory. In some cases, the method may include accessing contents of the physical page to determine an offset at a location of the logical pages, wherein the one or more logical pages are transferred based on the offset.

While specific language has been used to describe the disclosure, any limitations arising on account of the same are not intended. As would be apparent to a person in the art, various working modifications may be made to the method to implement the inventive concept as taught herein.

The drawings and the forgoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, orders of processes described herein may be changed and are not limited to the manner described herein.

Moreover, the actions of any flow diagram need not be implemented in the order shown nor do all of the acts necessarily need to be performed. Also, those acts that are not dependent on other acts may be performed in parallel with the other acts. The scope of embodiments is by no means limited by these specific examples. Numerous variations, whether explicitly given in the specification or not, such as differences in structure, dimension, and use of material, are possible. The scope of embodiments is at least as broad as given by the following claims.

Benefits, other advantages, and solutions to problems have been described above with regard to specific embodiments. However, the benefits, advantages, solutions to problems, and any component(s) that may cause any benefit, advantage, or solution to occur or become more pronounced are not to be construed as a critical, required, or essential feature or component of any or all the claims.

What is claimed is:

1. A method of logical to physical mapping for a data storage device comprising a non-volatile memory device, said method comprising:

defining a first type of information within the non-volatile memory as representing at least partly a logical-to-physical (L2P) address translation map, wherein the first type of information indicates a physical page of the non-volatile memory that corresponds to a logical page;

storing a second type of information pertaining to the L2P translation map in a part of the physical page within the non-volatile memory, wherein the second type of information indicates an offset of the logical page within the physical page; and mapping the first and second type of information to draw a logical to physical mapping and thereby determine a physical location, within one or more physical pages, of data stored in each logical page.

2. The method as claimed in claim 1, wherein the second type of information is stored within a spare area of the non-volatile memory to thereby enable an L2P table and the spare area at rendering the complete logical to physical map.

3. The method as claimed in claim 1, the method further comprises:
writing data in a plurality of logical pages corresponding to a single physical page of the non-volatile memory, each of the plurality of logical pages being associated with a logical page number configured to enable a controller to logically reference data in one corresponding physical page;
updating a spare area within the non-volatile memory to indicate the logical page number;
updating the L2P translation map to point to the physical page defining a location of storage of the logical page; and
transferring the written data to the physical location of the non-volatile memory in accordance with the translation map to thereby enable a writing of the data into the non-volatile memory.

4. The method as claimed in claim 1, the method further comprising:
fetching the physical page holding a plurality of logical pages based on the first type of information;
accessing contents of the physical page to determine the offset at the physical location of the logical page corresponding to the first type of information; and
transferring the offset corresponding to the logical page referred by the first type of information to enable data transfer to a volatile memory to enable a read operation of content from the non-volatile memory.

5. The method as claimed in claim 4, wherein the read operation is defined by operation of a data extractor as:
transferring the logical page corresponding to the first type of information from the physical page to a volatile memory to enable the read operation.

6. The method as claimed in claim 1, wherein an order of the logical pages within the physical page corresponds to a sequence of plurality of logical page numbers in a spare area of the physical page.

7. The method as claimed in claim 1, wherein within a spare area of the physical page, a plurality of logical page numbers of a plurality of logical pages are stored.

8. A data storage device facilitating logical-to-physical (L2P) mapping, said device comprising:
at least one of a storage buffer and a non-volatile memory configured to:
maintain a first type of information representing at least partly an L2P address translation map, wherein the first type of information indicates a physical page of the non-volatile memory that corresponds to a logical page; and
maintain a second type of information pertaining to the L2P address translation map in a part of the physical page of the non-volatile memory, wherein the second type of information indicates an offset of the logical page within the physical page; and
a processing device for mapping the first and second type of information to draw an L2P mapping and thereby determine a physical location, within the physical page, of data stored in a logical page.

9. The device as claimed in claim 8, wherein the non-volatile memory stores the second type of information in a spare area and stores an L2P table within the storage buffer to enable the rendering of a complete L2P map.

10. The device as claimed in claim 8, wherein the processing device is configured to facilitate a write operation through:
receiving data to be written in a plurality of logical pages corresponding to a single physical page of the non-volatile memory, each of the plurality of logical pages being associated with a logical page number configured to enable a controller to logically reference data in one corresponding physical page;
updating a spare area within the non-volatile memory to indicate a logical page number;
updating the L2P address translation map to point to the corresponding physical page defining a location of storage of the logical page; and
transferring the written data to the location of storage in accordance with the L2P address translation map.

11. The device as claimed in claim 8, wherein during a read operation, the processing device is configured to:
fetch the physical page holding a plurality of logical pages based on the first type of information;
access contents of the physical page to determine the offset at the location of the logical page corresponding to the first type of information; and
transfer the offset corresponding to the logical page referred by the first type of information to enable data transfer to a volatile memory to enable the read operation.

12. The device as claimed in claim 11, wherein the processing device comprises a data extraction module to enable a read-operation including:
transferring the logical page corresponding to the first type of information from the physical page to the volatile memory to enable the read operation.

13. The device as claimed in claim 12, wherein the physical page of the volatile memory comprises an order of logical pages within the physical page corresponding to a sequence of the logical page numbers in a spare area of the physical page.

14. The device as claimed in claim 13, wherein the spare area of the physical page comprises a plurality of logical page numbers indicating where the plurality of logical pages are stored.

15. The device as claimed in claim 8, wherein the buffer corresponds to a 96 KB buffer comprising at-least one of: a) 24 logical pages of 4 KB; and b) 12 pages of 8 KB and defined by a double data-rate random access memory (DRAM).

16. A method of storing data in a memory device, the method comprising:
storing data corresponding to a plurality of logical pages in a physical page of the memory device;
storing first address information in a logical-to-physical (L2P) table, wherein the first address information indicates the physical page of the memory device where the logical pages are stored;
storing second address information in a spare area of the physical page, wherein the second address information indicates a location of each of the logical pages within the physical page, and wherein the first address information and the second address information form an L2P mapping between the logical pages and corresponding physical locations of the memory device; and
reading at least a portion of the data from the memory device based at least in part on the first address information and the second address information.

17. The method of claim 16, further comprising:
receiving a write command from an external host device, wherein the write command includes an indication of the data the logical pages, and wherein the data is stored in response to the write command.

18. The method of claim 16, further comprising:
receiving a read command from an external host device, wherein the read command indicates one or more of the logical pages;

identifying the physical page based on the read command and the first address information in the L2P table;

identifying one or more portions of the physical page where the one or more logical pages are stored based on the second address information stored in the spare area, wherein the at least a portion of the data is read in response to the read command.

19. The method of claim 18, further comprising:
transferring the one or more logical pages from the physical page to a volatile memory, wherein the at least a portion of the data is read from the volatile memory.

20. The method of claim 18, further comprising:
accessing the physical page to determine an offset at a location of the logical pages, wherein the one or more logical pages are transferred based on the offset.

* * * * *